(12) United States Patent
Pan et al.

(10) Patent No.: US 9,310,392 B2
(45) Date of Patent: Apr. 12, 2016

(54) WHEEL-SPEED SENSOR MOUNTING DEVICE

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Hongming Pan, Guangdong (CN); Hongmei Yuan, Guangdong (CN)

(73) Assignees: BYD Company Limited, Shenzhen, Guangdong (CN); Shenzhen BYD Auto R&D Company Limited, Shenzhen, Guangdong (CN)

( * ) Notice: Subject to any disclaimer, the term of this patent is extended or adjusted under 35 U.S.C. 154(b) by 143 days.

(21) Appl. No.: 14/186,884

(22) Filed: Feb. 21, 2014

(65) Prior Publication Data

US 2014/0167741 A1 Jun. 19, 2014

Related U.S. Application Data

(63) Continuation of application No. PCT/CN2012/080694, filed on Aug. 29, 2012.

(30) Foreign Application Priority Data

Aug. 29, 2011 (CN) ...................... 2011 2 0318371 U (51) Int. Cl.
*G01B 7/30* (2006.01)
*G01P 3/44* (2006.01)
(Continued)

(52) U.S. Cl.
CPC ................ *G01P 3/44* (2013.01); *F16H 57/029* (2013.01); *G01D 11/245* (2013.01); *G01P 1/00* (2013.01);
(Continued)

(58) Field of Classification Search
CPC ..... G01D 11/245; G01D 11/24; G01D 5/145; G01P 3/443; G01P 3/489; G01P 3/48; G01P 3/481
USPC ...................... 324/207.25, 173, 166
See application file for complete search history.

(56) References Cited

U.S. PATENT DOCUMENTS

| 6,018,988 A | 2/2000 | Persson | |
|---|---|---|---|
| 2004/0119465 A1* | 6/2004 | Clark | 324/174 |
| 2012/0112742 A1* | 5/2012 | Schrader | 324/252 |
| 2012/0282793 A1* | 11/2012 | Brune et al. | 439/278 |

FOREIGN PATENT DOCUMENTS

| CN | 2098036 U | 3/1992 |
|---|---|---|
| CN | 2721964 Y | 8/2005 |

(Continued)

OTHER PUBLICATIONS

PCT International Search Report mailed Nov. 29, 2012, issued in International Application No. PCT/CN2012/080694 (7 pages).

*Primary Examiner* — Reena Aurora
(74) *Attorney, Agent, or Firm* — Finnegan, Henderson, Farabow, Garrett & Dunner, LLP (57) ABSTRACT

A wheel-speed sensor mounting device may be provided. The wheel-speed sensor mounting device includes a reducer case having a first mounting hole, a mounting shell mounted within the first mounting hole and having a first end extending into the reducer case and a second end, a wheel-speed sensor mounted within the mounting shell and having a first end extending out of the first end of the mounting shell and opposing to a sensing metal ring mounted in the reducer case and a second end having a lead-out wire, and a sealing member for sealing the second end of the mounting shell. The lead-out wire passes through the sealing member and extends out of the reducer case.

18 Claims, 5 Drawing Sheets

(51) Int. Cl.
   *F16H 57/029* (2012.01)
   *G01P 1/00* (2006.01)
   *G01P 1/02* (2006.01)
   *G01D 11/24* (2006.01)
   *G01P 3/481* (2006.01)
   *G01P 3/489* (2006.01)
   *G01P 3/48* (2006.01)
   *F16H 59/38* (2006.01)

(52) U.S. Cl.
   CPC ................. *G01P 1/026* (2013.01); *G01P 3/443* (2013.01); *F16H 59/38* (2013.01); *G01P 3/48* (2013.01); *G01P 3/481* (2013.01); *G01P 3/489* (2013.01)

(56) References Cited

FOREIGN PATENT DOCUMENTS

| | | |
|---|---|---|
| CN | 1888466 A | 1/2007 |
| CN | 201002890 Y | 1/2008 |
| CN | 101281207 A | 10/2008 |
| CN | 201177042 Y | 1/2009 |
| CN | 201344226 Y | 11/2009 |
| CN | 101688878 A | 3/2010 |
| CN | 201607453 U | 10/2010 |
| CN | 201637755 U | 11/2010 |
| CN | 202216960 U | 5/2012 |
| WO | WO 2013/029538 A1 | 3/2013 |

* cited by examiner

WHEEL-SPEED SENSOR MOUNTING DEVICE

CROSS-REFERENCE TO RELATED APPLICATIONS

This application is a continuation application of International Application No. PCT/CN2012/080694, filed Aug. 29, 2012, which claims priority to and benefits of Chinese Patent Application Serial No. 201120318371.6, filed with the State Intellectual Property Office of P. R. China on Aug. 29, 2011. The entire contents of the above-referenced applications are incorporated herein by reference.

FIELD

The present disclosure relates to the field of vehicle, more particularly to a wheel-speed sensor mounting device.

BACKGROUND

The statements in this section merely provide background information related to the present disclosure and may not constitute prior art.

Conventionally, a wheel-speed sensor is used for detecting the rotation speed of a vehicle's wheel by cooperating with a sensing metal ring. The wheel-speed sensor and the sensing metal ring usually are mounted near a brake disc of the vehicle. However, because wheel-speed sensor and the sensing metal ring are exposed to the external environment directly, the environmental impurities and liquid may affect the sensitivity of the wheel-speed sensor or aggravate aging of the wheel-speed sensor accordingly.

SUMMARY

This summary is provided to introduce a selection of concepts in a simplified form that are further described below in the Detailed Description. This summary is neither intended to identify key features or essential features of the claimed subject matter, nor intended to be used as an aid in determining the scope of the claimed subject matter.

In viewing thereof, embodiments of the present disclosure are directed to solve at least one of the problems existing in the prior art. Accordingly, a wheel-speed sensor mounting device may be provided, which may protect the wheel-speed sensor from being affected or damaged by the environmental impurities and liquid.

According to embodiments of the present disclosure, a wheel-speed sensor mounting device may be provided. The wheel-speed sensor mounting device may comprise a reducer case, a mounting shell, a wheel-speed sensor and a sealing member. The reducer case may have a first mounting hole, the mounting shell may mount within the first mounting hole and have a first end extending into the reducer case and a second end. The wheel-speed sensor is mounted within the mounting shell and has a first end extending out of the first end of the mounting shell to oppose to a sensing metal ring mounted in the reducer case and a second end having a lead-out wire. The sealing member is used for sealing the second end of the mounting shell, and the lead-out wire passes through the sealing member to extend out of the reducer case.

With the wheel-speed sensor mounting device according to the embodiments of the present disclosure, the wheel-speed sensor is prevented from being exposing to the external environment. The environmental impurities and liquid may not affect or damage the wheel-speed sensor, thus reducing the negative effects caused by the environmental impurities and liquid.

Other advantages and features of the disclosure are described below.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. It is to be understood that, the embodiments described herein are merely used to generally understand the present disclosure, but shall not be construed to limit the present disclosure.

In the following, detailed description of embodiments of a wheel-speed sensor mounting device will be described.

As shown in FIG. 1 to FIG. 5, in one embodiment, the wheel-speed sensor mounting device may comprise a reducer case 5, a mounting shell 2, a wheel-speed sensor 1, and a sealing member 3.

Figure 1:
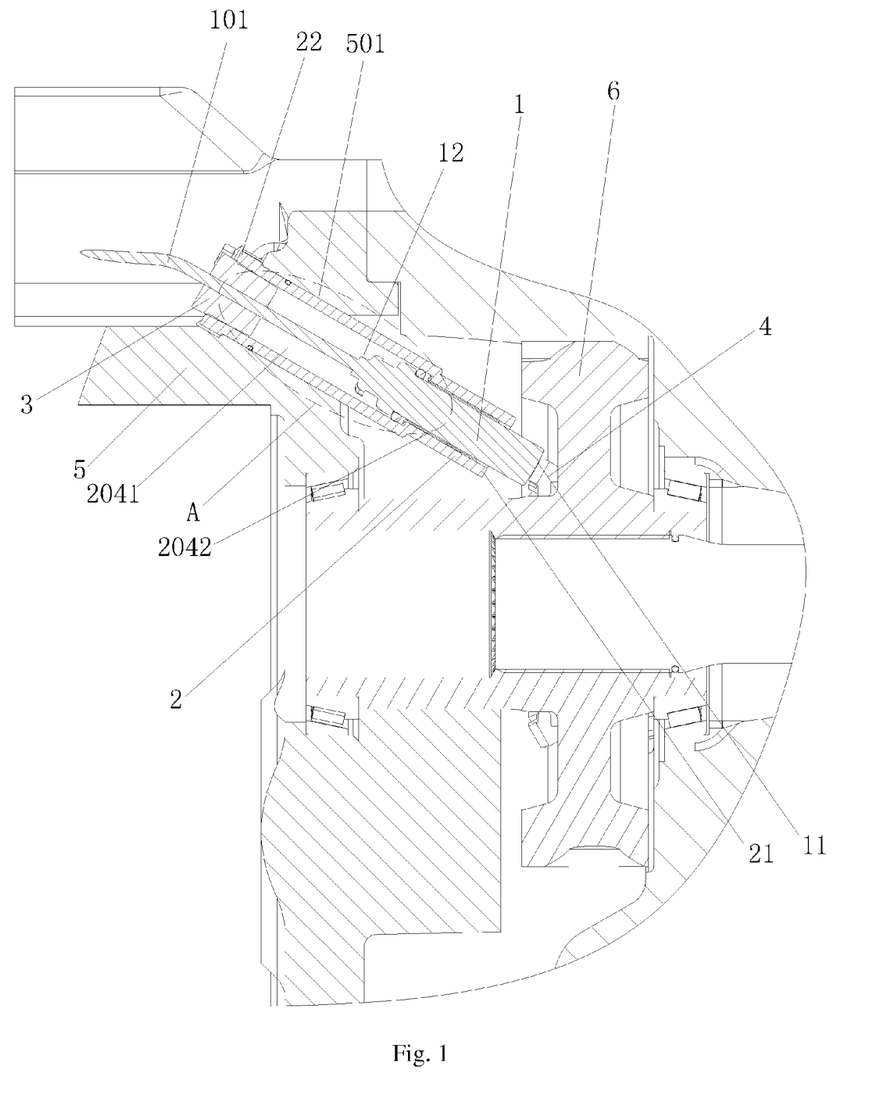
FIG. 1 is a schematic view of a wheel-speed sensor mounting device according to an embodiment of the present disclosure.

The reducer case 5 has a first mounting hole 501, and the mounting shell 2 is mounted within the first mounting hole 501. A gear 6 is rotatably mounted in the reducer case 5. A sensing metal ring 4 is mounted onto the gear 6 to cooperate with the wheel-speed sensor 1, thus detecting the rotation speed of a wheel of the vehicle.

The mounting shell 2 has a first end 21 (the lower right end in FIG. 1) and a second end 22 (the upper left end in FIG. 1) opposed to the first end 21. The first end 21 extends into the reducer case 5. The wheel-speed sensor 1 having a first end 11 and a second end 12 is mounted within the mounting shell 2, the first end 11 of the wheel-speed sensor 1 is used as the sensing end thereof and extends out of the first end 22 of the mounting shell 2 to oppose to the sensing metal ring 4. The second end 12 of the wheel-speed sensor 1 has a lead-out wire 101. The lead-out wire extends through the sealing member 3 to extend out of the mounting shell 2.

The sealing member 3 may be used for sealing the second end 22 of the mounting shell 2. The lead-out wire 101 passes through the sealing member 3 to extend out of the reducer case 5. The sealing member 3 can be fitted within the second end 22 of the mounting shell 2.

In some embodiments, the reducer case 5 may be formed by at least two case parts. Considering the lubrication and cooling performance, the reducer case 5 may have an enclosed structure. It should be noted that the wheel-speed sensor mounting device according to embodiments of the present disclosure may be applicable to various reducers and transmissions.

Figure 2:
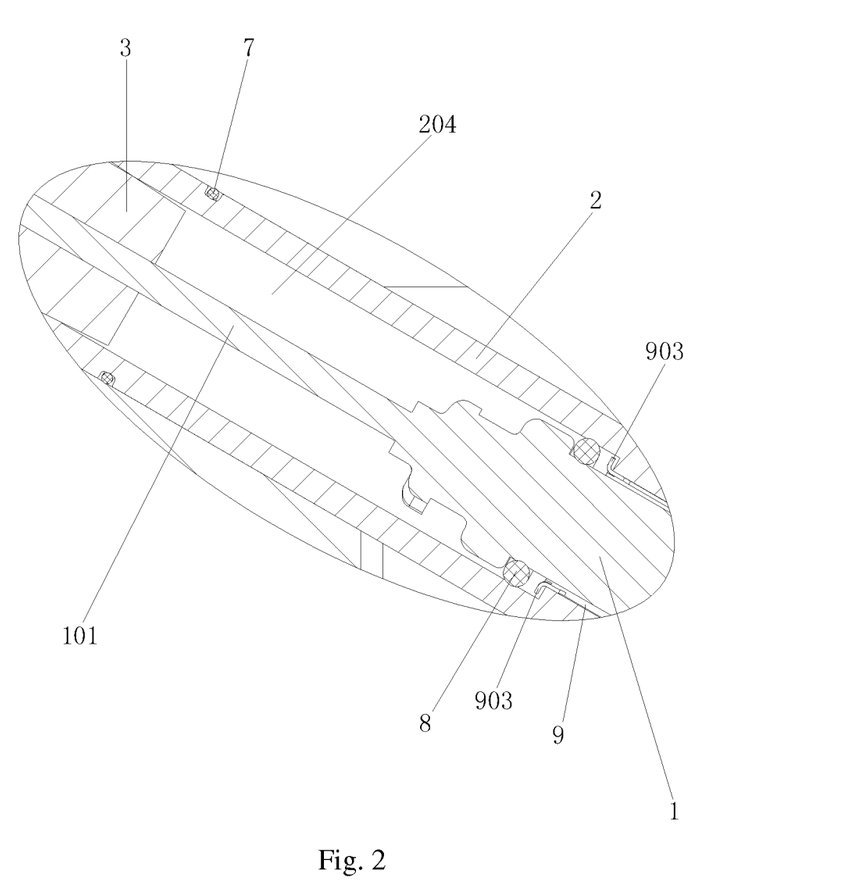
FIG. 2 is an enlarged schematic view of the part A indicated in FIG. 1.
Figure 3:
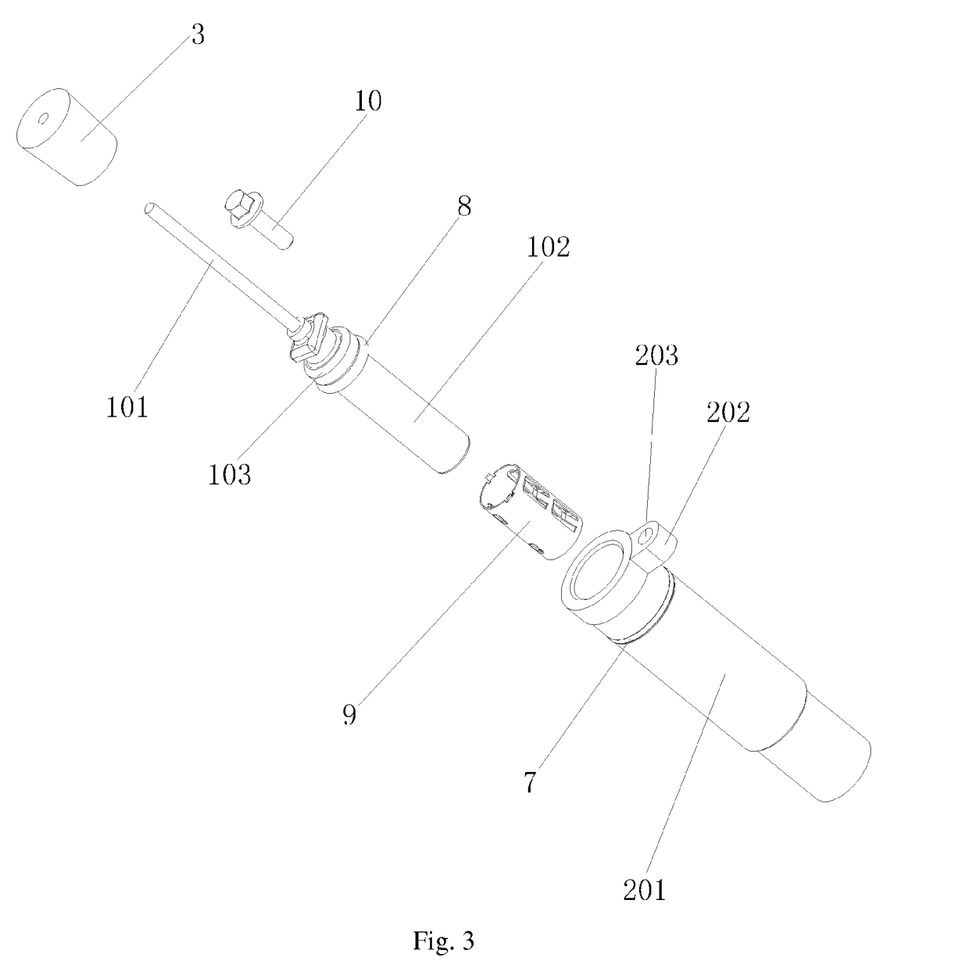
FIG. 3 is an exploded perspective partial view of a wheel-speed sensor mounting device according to an embodiment of the present disclosure.

In some embodiments, as shown in FIG. 1 to FIG. 3, the wheel-speed sensor mounting device may further comprise a first sealing ring 7 disposed between the reducer case 5 and the mounting shell 2. The first sealing ring 7 may be configured to be an O-ring. Because of the first sealing ring 7, the sealing performance between the mounting shell 2 and the first mounting hole 501 is improved.

In some embodiments, as shown in FIG. 1 and FIG. 3, the mounting shell 2 may comprise a cylindrical body 201 and a mounting lug 202 protruded from the cylindrical body 201 and adjacent to the second end 22 of the mounting shell 2. The mounting lug 202 is formed with a second mounting hole 203. The wheel-speed sensor 1 is mounted within the cylindrical body 201, and the mounting shell 2 is fastened to the reducer case 5 via a screw 10 passing through the second mounting hole 203 and screwed into the reducer case 5. The reducer case 5 may be formed with a screw hole. The mounting shell 2 can be fastened to the reducer case 5 via the screw 10 passing through the second mounting hole 203 and screwed into the screw hole. By using the screw 10, the fastening performance between the mounting shell 2 and the reducer case 5 is improved.

In some embodiments, as shown in FIG. 1 to FIG. 3, the wheel-speed sensor mounting device may further comprise a second sealing ring 8 disposed between the wheel-speed sensor 1 and the mounting shell 2. The second sealing ring 8 may be configured to be an O-ring. By using the second sealing ring 8, the sealing performance between the wheel-speed sensor 1 and the mounting shell 2 is improved.

In some embodiments, as shown in FIG. 1, the cylindrical body 201 may have an axial hole 204 which is configured as a stepped hole having a large hole section 2041 and a small hole section 2042. The wheel-speed sensor 1 may comprise a column body 102 and a head part 103 axially connected to the column body 102. The head part 103 is disposed within the large hole section 2041, and the column body 102 is disposed within the small hole section 2042 and extends out of the mounting shell 2. The lead-out wire 101 extends from the head part 103, and the second sealing ring 8 is disposed between the column body 102 and an inner wall of the large hole section 2041.

Figure 4:
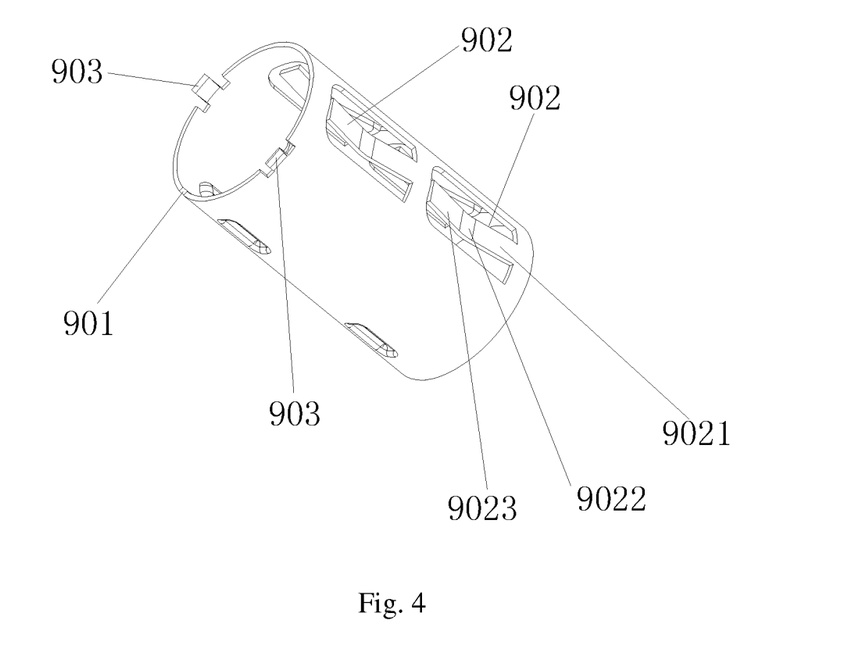
FIG. 4 is a schematic view of a sleeve of the wheel-speed sensor mounting device according to an embodiment of the present disclosure.

In some embodiments, as shown in FIG. 2 to FIG. 4, the wheel-speed sensor mounting device may further comprise a sleeve 9. The sleeve 9 has an axial slot 901 extending therethrough along an axial direction thereof and is disposed between the wheel-speed sensor 1 and the mounting shell 2.

As shown in FIG. 4, the sleeve 9 may be provided with at least one elastic piece 902 for pushing against the wheel-speed sensor 1. The elastic piece 902 may be formed by punching a part of the sleeve 9. In some embodiments, the elastic piece 902 may have a fixed end 9021, a free end 9023, and a middle part 9022. The fixed end 9021 is connected to the sleeve 9, and the middle part 9022 is formed between the fixed end 9021 and the free end 9023. The free end 9023 extends inwardly so as to push against the wheel-speed sensor 1, as shown in FIG. 4.

By providing the axial slot 902, the diameter of the sleeve 9 may vary easily to be suitable for the stepped hole 204, and the sleeve 9 may assist mounting the wheel-speed sensor 1 into the mounting shell 2 firmly. The elastic piece 902 helps the wheel-speed sensor 1 be in tight contact with the sleeve 9 and improves the fixing performance between the wheel-speed sensor 1 and the mounting shell 2. Moreover, the elastic piece 902 can absorb shocks caused by the vehicle, thus ameliorating the negative effects caused by shocks.

In some embodiments, as shown in FIG. 4, the sleeve 9 may be further provided with at least two catching claws 903 at an end of the sleeve 9. The sleeve 9 across the boundary between the column body 201 and the small hole section 2042, and the catching claws 903 are secured by a bottom end surface of the large hole section 2041.

In some embodiments, the catching claws 903 may be integrated with the sleeve 9.

In some embodiments, the sealing member 3 is fitted within the large hole section 2041 and away from the small hole section 2042. The sealing member 3 may be configured as an elastic sealing plug, which is inserted into and seal the second end 22 of the mounting shell 2.

The sealing member 3 can be made of rubber or other elastic material. The sealing member 3 has a leading hole through which the lead-out wire 101 is passed and be in tight contact with the inner wall of the leading hole.

In some embodiments, the leading hole can be formed by cutting a slit in the sealing member 3, and the lead-out wire 101 can be lead out from the slit. Because the sealing member is made of elastic material, the slit does not affect the sealing performance of the sealing member 3.

Figure 5:
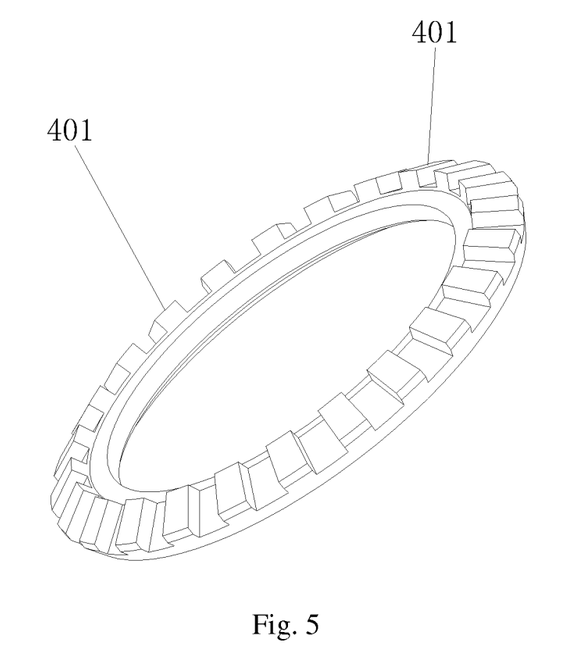
FIG. 5 is a schematic view of a sensing metal ring mounted in the wheel-speed sensor mounting device according to an embodiment of the present disclosure.

In some embodiments, as shown in FIG. 5, the sensing metal ring 4 may be formed with a plurality of protrusions 401 distributed uniformly along a circumferential direction thereof. Each protrusion 401 is adapted to oppose to the first end 11 of the wheel-speed sensor 1 during rotation of the sensing metal ring 4.

The wheel-speed sensor 1 may be well known and have various types. The sensing ranges of different types are different accordingly. For example, the sensing range of one type of wheel-speed sensor is within 1 mm, and the sensing range of another type of wheel-speed sensor may be within 5 mm. When the protrusion 401 is within the sensing range of the wheel-speed sensor, it can be scanned by the wheel-speed sensor, and the wheel-speed sensor will generate an electrical signal.

In some embodiments, as shown in FIG. 5, a cross section of each protrusion 401 may be a rectangle shape. The rectangle shape can improve the sensing performance. It should be noted that the protrusion 401 may have other shapes, as long as it can be scanned by the wheel-speed sensor.

The wheel-speed sensor mounting device according to embodiments of the present disclosure may provide a protective structure for preventing the wheel-speed sensor from exposing to the external environment, so that the environmental impurities and liquid will not be in contact with the wheel-speed sensor and the sensing ring, thus improving the detecting accuracy of the wheel rotation speed, and the service life of each of the wheel-speed sensor and sensing ring is prolonged. Furthermore, the wheel-speed sensor can be reliably mounted in the reducer case.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A wheel-speed sensor mounting device, comprising:
   a reducer case having a first mounting hole and a sensing metal ring mounted on the reducer case;

a mounting shell mounted within the first mounting hole and having a first end extending into the reducer case and a second end, wherein the mounting shell is configured to mount a wheel-speed sensor therewithin, wherein the first end of the mounting shell is configured to enable a first end of the wheel-speed sensor to extend out of the mounting shell and opposing to the sensing metal ring; and a sealing member for sealing the second end of the mounting shell, wherein the second end of the mounting shell enables a lead-out wire of the wheel-speed sensor to pass through the sealing member and to extend out of the reducer case; and a first sealing ring disposed at a mounting position of the wheel-speed sensor within the mounting shell.

2. The wheel-speed sensor mounting device of claim 1, wherein the sealing member is an elastic sealing plug fitted within the second end of the mounting shell.

3. The wheel-speed sensor mounting device of claim 1, further comprising a second sealing ring disposed between the reducer case and the mounting shell.

4. The wheel-speed sensor mounting device of claim 1,
wherein the mounting shell comprises a cylindrical body configured to mount the wheel-speed sensor therewithin and a mounting lug protruding from the cylindrical body and adjacent to the second end of the mounting shell, and the mounting lug is formed with a second mounting hole, and wherein the mounting shell is fastened to the reducer case via a screw passing through the second mounting hole and screwed into the reducer case.

5. The wheel-speed sensor mounting device of claim 1, wherein the mounting shell comprises a cylindrical body having an axial hole which is configured as a stepped hole having a large hole section and a small hole section, wherein the wheel-speed sensor comprises a column body and a head part axially connected to the column body, the head part is disposed within the large hole section, and the column body is disposed within the small hole section and extends out of the mounting shell, the lead-out wire extends from the head part, the second sealing ring is disposed between the column body and an inner wall of large hole section.

6. The wheel-speed sensor mounting device of claim 1, further comprising a sleeve having an axial slot and being disposed between the wheel-speed sensor and the mounting shell.

7. The wheel-speed sensor mounting device of claim 6, wherein the sleeve is provided with at least one elastic piece for pushing against the wheel-speed sensor.

8. The wheel-speed sensor mounting device of claim 7, wherein the elastic piece is formed by punching a part of the sleeve.

9. The wheel-speed sensor mounting device of claim 7, wherein the elastic piece has a fixed end connected to the sleeve, a free end, and a middle part between the fixed end and the free end extended inwardly so as to push against the wheel-speed sensor.

10. The wheel-speed sensor mounting device of claim 9, wherein the mounting shell comprises a cylindrical body having an axial hole which is configured as a stepped hole having a large hole section and a small hole section, wherein the wheel-speed sensor comprises a column body and a head part axially connected to the column body, the head part is disposed within the large hole section, and the column body is disposed within the small hole section and extends out of the mounting shell, the lead-out wire extends from the head part, and wherein the sleeve is provided with at least two catching claws at an end thereof, the sleeve is disposed between the column body and the small hole section, and the catching claws are secured by a bottom end surface of the large hole section.

11. The wheel-speed sensor mounting device of claim 10, wherein the catching claws are integrated with the sleeve.

12. The wheel-speed sensor mounting device of claim 11, wherein a cross section of each protrusion has a rectangle shape.

13. The wheel-speed sensor mounting device of claim 1, wherein the mounting shell comprises a cylindrical body having an axial hole which is configured as a stepped hole having a large hole section and a small hole section, and wherein the sealing member is fitted within the large hole section and away from the small hole section.

14. The wheel-speed sensor mounting device of claim 1, wherein the sensing metal ring is formed with a plurality of protrusions distributed uniformly along a circumferential direction of the sensing metal ring.

15. A wheel-speed sensor mounting device, comprising:
a reducer case having a first mounting hole;
a mounting shell mounted within the first mounting hole and having a first end extending into the reducer case and a second end, wherein the mounting shell is configured to mount a wheel-speed sensor therewithin, wherein the first end of the mounting shell is configured to enable a first end of the wheel-speed sensor to extend out of the mounting shell;

a sealing member for sealing the second end of the mounting shell; and a sealing ring disposed at a mounting position of the wheel-speed sensor within the mounting shell.

16. The wheel-speed sensor mounting device of claim 15, wherein the second end of the mounting shell enables a lead-out wire of the wheel-speed sensor to pass through the sealing member and to extend out of the reducer case.

17. A wheel-speed sensor assembly, comprising:
a wheel-speed sensor including a first end and a second end having a lead-out wire;
a wheel-speed sensor mounting device comprising:
a reducer case having a first mounting hole and a sensing metal ring mounted on the reducer case,
a mounting shell mounted within the first mounting hole and having a first end extending into the reducer case and a second end, wherein the wheel-speed sensor is mounted within the mounting shell, and the first end of the wheel-speed sensor extends out of the first end of the mounting shell and opposing to the sensing ring,
a sealing member for sealing the second end of the mounting shell, wherein the lead-out wire of the wheel-speed sensor passes through the sealing member and extends out of the reducer, and
a sealing ring disposed between the wheel-speed sensor and the mounting shell.

18. A wheel-speed sensor assembly, comprising:
a wheel-speed sensor including a first end and a second end having a lead-out wire;
a wheel-speed sensor mounting device comprising:
a reducer case having a first mounting hole,
a mounting shell mounted within the first mounting hole and having a first end extending into the reducer case and a second end, wherein the wheel-speed sensor is mounted within the mounting shell, and the first end of the wheel-speed sensor extends out of the first end of the mounting shell, a sealing member for sealing the second end of the mounting shell, and a sealing ring disposed between the wheel-speed sensor and the mounting shell.

\* \* \* \* \*